Figure 4:
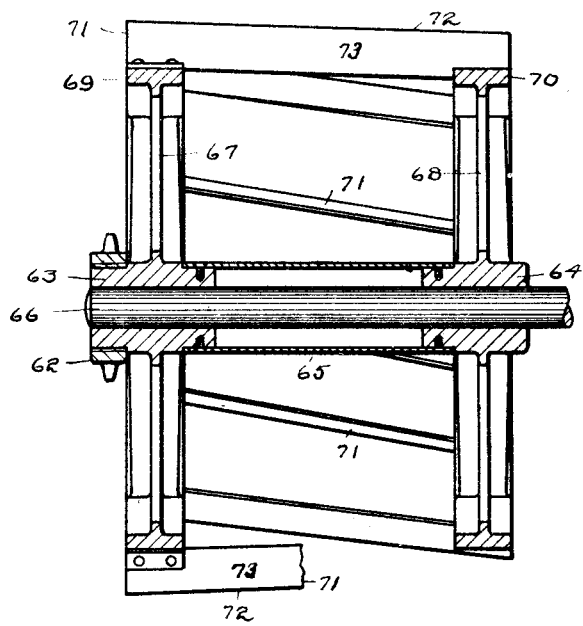

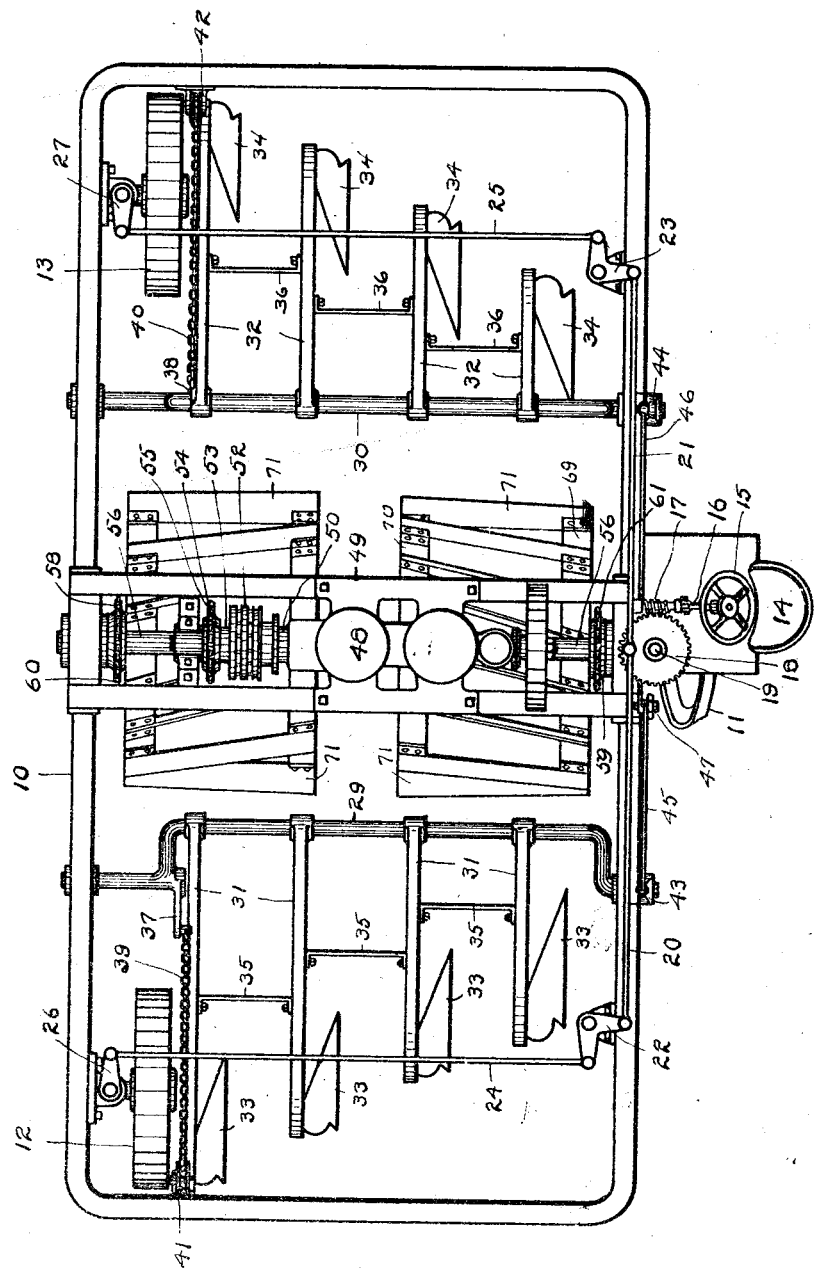

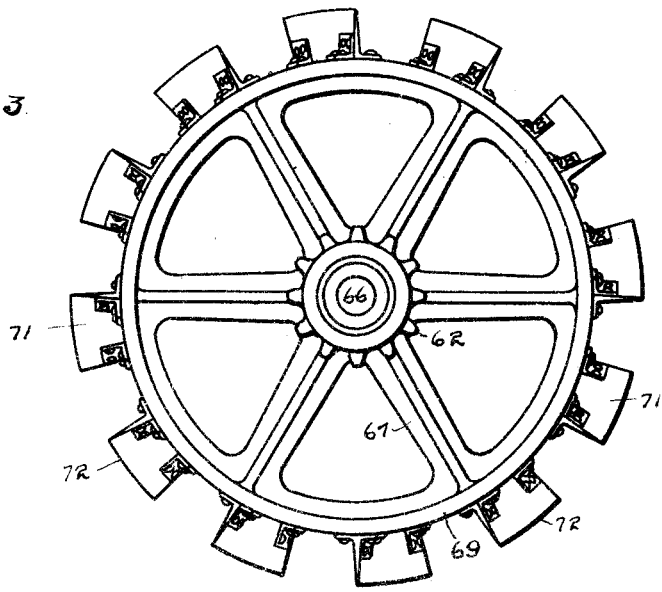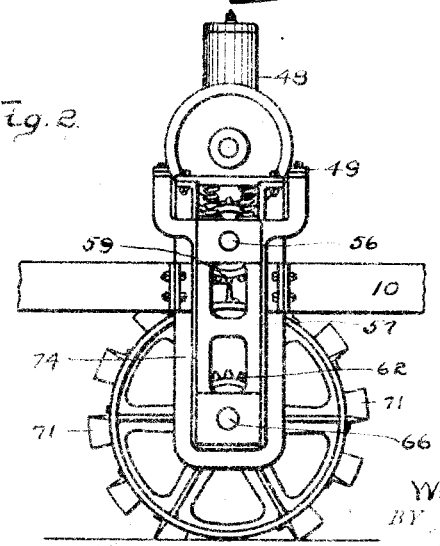

UNITED STATES PATENT OFFICE.

WILLIAM J. HOFFMAN, OF NEAR MONROEVILLE, INDIANA, ASSIGNOR OF ONE-HALF TO SAMUEL J. MARQUARDT, OF NEAR MONROEVILLE, INDIANA.

TRACTION-PLOW.

1,185,202.  Specification of Letters Patent.  Patented May 30, 1916.

Application filed March 1, 1913. Serial No. 751,398.

*To all whom it may concern:*

Be it known that I, WILLIAM J. HOFFMAN, a citizen of the United States, residing near Monroeville, in the county of Allen and State of Indiana, have invented new and useful Improvements in Traction-Plows, of which the following is a specification.

This invention relates to traction plows and particularly to improvements in the tractor wheels or drums of said plows and in the manner of mounting the power mechanism and drums as a unit on the main frame of the device.

It is becoming a well recognized fact that the soil should be more or less pulverized before it is plowed into furrows, in order to better prepare it for agricultural purposes.

The object of my invention is to provide a traction plow, the tractor wheels or drum of which shall be capable of efficiently pulverizing the soil previous to the cutting of the furrow by the plow, the said drums having a flexible connection to the main frame of the device so as to permit the said drums and source of power to flex vertically on the frame and thereby relieve all undue strain on the power producing mechanism.

The invention consists in the novel construction, arrangement and combination of parts hereinafter described and illustrated in the drawings, in which drawings—

Figure 1 is a plan view of a traction plow provided with my invention; Fig. 2, a fractional side view of the same illustrating the manner of supporting the tractor drums and power producing mechanism in the main frame; Fig. 3, an end elevation of one of the tractor drums and Fig. 4, a central sectional view of the drum.

Referring to the drawings, 10 is the main frame of the plow, having a furrow wheel 11 pivotally mounted on one of its sides and two steering wheels 12, 13 pivotally mounted on the other side thereof. At one side of the frame, preferably over the furrow wheel 11, is secured a seat 14 for the operator, and in front of the seat is a steering post 16 having at its lower end a worm gear 17, which is in mesh with a horizontally arranged gear wheel 18, which is secured to the upper end of a post 19, the lower end of which post is suitably connected to furrow wheel 11 for turning the same. To this gear wheel are removably pivoted one end of connecting rods 20, 21 which extend in opposite directions, the other ends of the rods being connected to one arm of bell cranks 22, 23, respectively, which are mounted on frame 10. To the other arms of the bell cranks are connected rods 24, 25 respectively, which extend transversely across the main frame and are connected respectively to cranks 26, 27 which are suitably secured to steering wheels 12 and 13 respectively. By turning the steering wheel 15 in either direction its post and worm gear rotate gear wheel 18, the rotation of which turns the furrow wheel in the proper direction and will cause rods 20, 21 to move longitudinally in the same direction and rock bell cranks 22, 23. Crank 22 exerts a pulling effort on crank 26, and crank 23 exerts a pushing effort on crank 27, whereby the steering wheels 12, 13 are caused to turn on their pivots in opposite directions according to the direction in which the steering wheel is rotated.

At suitable points on frame 10 are revolubly mounted two crank shafts 29, 30 which extend transversely across the frame. To each shaft is pivotally connected one end of a suitable number of plow beams 31, 32 which extend toward opposite ends of the frame. Plows 33, 34 are connected to the other ends of beams 31, 32, the points of plows 33 facing the points of plows 34 in order that the device may operate back and forth across the field without being turned around when the ends of the field are reached. The several beams are connected by cross bars 35, 36 in order that each gang of plows shall form a unit for raising and lowering purposes. The plows of each gang are arranged one in advance of the other as is usual in all gang plows.

Cranks 37 and 38 are secured to crank shafts 29, 30 respectively and attached to the outer ends of said cranks are chains 39, 40 which pass over idlers 41, 42 which are carried by the main frame, and the chains are connected at their lower ends to the beam of one plow of each gang. It is apparent that as either crank shaft is rotated to cause the eccentric portion thereof to travel upwardly the chain will elevate the gang of plows off the ground since the crank to which it is connected travels downwardly, thereby drawing the chain toward the crank shaft. At the same time the eccentric portion of the crank shaft elevates the plow beams and swings the plows toward the end of the frame thereby enabling the plows to be readily withdrawn from the ground. When the crank shaft is rotated in the opposite direction the chain permits the plows to lower and the eccentric portion of the shaft draws the points of the plows into the ground, the relative positions of the eccentric portion of the shaft and the crank 37 being such that the points of the plows first meet the ground as the lowering operation is performed.

At one outer end of the crank shafts are secured cranks 43, 44 respectively to which cranks are connected suitable connecting rods 45, 46 which extend toward the seat. Rods 45, 46 are suitably connected to a lever 47 which is suitably mounted on frame 10 and extends upwardly in order to be convenient to the operator. When the operator rocks lever 47 toward one end of frame 10 the gang of plows at that end are elevated and the gang at the other end is lowered into the ground and vice versa according to the direction in which the plow is being operated.

I do not describe the steering mechanism and the gangs of plows nor the means for raising and lowering the plows in greater detail than I have heretofore done since two way gang plows and steering mechanisms are old in the art and I have described such of said mechanisms as will illustrate the application of my invention.

In the central portion of frame 10 I provide the source of power and the tractor drums which are assembled in a unitary group. The power is furnished by any suitable driving mechanism such as a gasolene or oil engine 48 of suitable horse power which is mounted upon an auxiliary frame 49 which extends across the main frame midway between the two gangs of plows. The main driving shaft 50 of the engine is provided with a reverse clutch 52 by which it is connected to a sprocket carrying shaft 53. The sprocket 54 on the latter shaft is connected by chain 55 to a sprocket below it which is secured to a counter shaft 56. Counter shaft 56 extends entirely across the main frame and is borne by bearings which are provided in the upright opposite end portions 57 of frame 49. Adjacent opposite ends of the counter shaft are secured two sprocket wheels 58, 59 which are connected by chains 60, 61 to sprocket wheels on the tractor drums, one of said latter sprocket wheels 62 being shown in Figs. 2 and 3.

The tractor drums are alike in construction, hence I need describe only one of them. The drum consists of a hub divided into two portions 63 and 64, which are connected by sleeve 65 and which are revolubly mounted on a shaft 66, which shaft is suitably carried in end portions 57 of the frame 49. Sprocket wheel 62 is mounted on one end of hub portion 63 and is differentially connected to the hub by any of the well known differential mechanisms (not shown) which will permit the wheel to run idly when the machine is being turned. Spokes 67, 68 radiate from the hubs respectively, and rims 69, 70 are secured to or are integral with the outer ends of the spokes. The rims are sufficiently spaced transversely so that there shall be a gap of considerable width between them, the peripheral surface of each rim being narrow relatively to the space between the rims. I have constructed the drum 24 inches in axial width and with it have obtained most satisfactory results.

Spanning the space between the rims and secured to their outer peripheries are a suitable number of knives 71. The knives are arranged in a diagonal direction relatively to the axis of the drum and those on one drum extend in the opposite direction to the direction of those on the other drum in order that the drums shall exert their power, when operating, in a straight line and not twist the machine out of that line or jar the power device, as they would tend to do if the knives on both drums extended in a parallel direction. The outer or transverse edge of each knife is tapered or sharpened to form a cutting edge 72 which, as the drum is rotated, will readily penetrate the ground and enable the entire outwardly extending portion 73 of each knife to pass into the ground, and as it moves in a circle it will cut up a considerable portion of the ground and drop it behind the drum and in front of the plows which are making the furrows behind the drum. Each knife digs up a portion of the ground as it penetrates it and the quantity of ground it shall dig up is controlled by the radial height of its portion 73. The knives may be arranged on the rims at any desired distance apart, it being apparent that the closer they are together the more effectually will they pulverize the soil. The rims 69, 70 are the only portions of the drum which present a flat surface to the ground and since they are comparatively narrow they have very little crushing effect on the ground.

The end portions 57 of the auxiliary frame 49 are vertically slidable in brackets 74 which are secured to each side of the main frame, consequently the entire frame 49 will flex vertically on the main frame, or it is relatively movable thereon in a vertical direction, and since the engine and the drums, together with the driving mechanism which connects them, are mounted on the auxiliary frame, the weight of those parts affords ample resistance between the ground and drums to cause the knives of the latter to enter the ground and to propel the machine. At the same time the entire propelling unit will yield vertically in case the ground is uneven or obstructs the entrance of the knives therein. Consequently harmful strains on the power mechanism are obviated by the flexible or movable mounting of the entire propelling unit.

What I claim is:

1. A digging tractor drum for a traction plow consisting of an axle, two rims mounted in spaced relation on the axle, and a plurality of angle bars secured at opposite ends to the peripheries of the rims, the bars being diagonally disposed relatively to the axis of the drum and having their outer longitudinal edges tapered to form digging blades.

2. In a traction plow a propelling drum for the plow consisting of two longitudinally spaced hubs each carrying a plurality of spokes, annular side means to connect the hubs, a relatively narrow rim secured to each set of spokes, and a plurality of peripherally spaced angle bars secured at opposite ends to both rims, the bars being obliquely arranged with respect to the axis of the hubs and the outer edge of the outwardly projecting flange of each bar being beveled to form a cutting edge.

In witness whereof I hereunto subscribe my name this 26th day of February, 1913.

WILLIAM J. HOFFMAN.

Witnesses: